United States Patent [19]

Watanabe et al.

[11] Patent Number: 5,493,354
[45] Date of Patent: Feb. 20, 1996

[54] INFORMATION RECORDING APPARATUS AND INFORMATION READOUT APPARATUS

[75] Inventors: Koji Watanabe; Toshiki Fujisawa, both of Hachioji; Kenji Yamanouchi; Takao Misawa, both of Hino, all of Japan

[73] Assignee: Konica Corporation, Japan

[21] Appl. No.: 315,676

[22] Filed: Sep. 30, 1994

Related U.S. Application Data

[63] Continuation of Ser. No. 110,657, Aug. 23, 1993, abandoned.

[30] Foreign Application Priority Data

Sep. 2, 1992 [JP] Japan .................................. 4-259008

[51] Int. Cl.⁶ .................................................. G03B 17/24
[52] U.S. Cl. ............................................. 354/106; 355/41
[58] Field of Search .................................. 354/105, 106; 355/40, 41

[56] References Cited

U.S. PATENT DOCUMENTS 5,122,645  6/1992  Saeki et al. ........................... 355/41 X

FOREIGN PATENT DOCUMENTS 62-86341   4/1987  Japan .
62-238542  10/1987  Japan .

*Primary Examiner*—Howard B. Blankenship
*Attorney, Agent, or Firm*—Jordan B. Bierman; Bierman and Muserlian

[57] ABSTRACT

An image recording machine has a plurality of light sources capable of emitting light independently for exposing a part of a photographic film without causing double exposure and with a printing controller. At least one of the light sources is caused to flash continuously for printing codes for timing during film transport, other light sources are caused to flash in synchronization with flashing of the light source for printing codes for photographing information, and the light source for printing the codes for photographing information is caused to flash for printing reference codes which are to be the judgment standards for the codes for photographing information.

11 Claims, 10 Drawing Sheets

INFORMATION RECORDING APPARATUS AND INFORMATION READOUT APPARATUS

This application is a continuation of application Ser. No. 08/110,657, filed Aug. 23, 1993, now abandoned.

BACKGROUND OF THE INVENTION

The present invention relates to an information recording apparatus wherein photographing information in photographing with a camera such as trimming information, information of whether or not a strobe is used, exposure (shutter speeds, stop values) information, and information of a film loading direction are coded and photographed on a film, and to an information reading out apparatus which reads information recorded on the film when such information are subjected to image processing on a printer or the like.

An information recording apparatus that photographs information on a film when photographing with a camera includes those disclosed in Japanese Patent Publication Open to Public Inspection Nos. 86341/1987, 238542/1987 and 238543/1987 (hereinafter referred to as Japanese Patent O.P.I. Publication), for example, and these are capable of photographing much information.

Namely, in the apparatus disclosed in Japanese Patent O.P.I. Publication No. 86341/1987, code information for a film are recorded through a combination of three light sources (red, green and blue) so that it may be possible to record by giving tripled amount of information to a single piece of microscopic code information utilizing recording capability of the three primary colors of blue, green and red of a color film.

In the information recording apparatus disclosed in Japanese Patent O.P.I. Publication No. 238642/1987, on the other hand, at least one light source of at least two or more light sources each being capable of emitting light independently for exposing a part of a film without causing double exposure is flashed continuously during film transport as a light source for timing, the other light source is flashed in synchronization with the flashing of the light source for timing depending on photographed information inputted, and thereby input of a pattern for timing is controlled through linkage with film transport for recording of the code information on the film.

Further, the information recording apparatus disclosed in Japanese Patent O.P.I. Publication No. 238543/1987 is equipped with a printing means for exposing a part of a film and with a control means that operates the printing means during film transport in an exposure-adjustable manner. In this apparatus, reference printing wherein the control means operates the printing means at predetermined intervals under the condition of a constant exposure amount is conducted, and information printing wherein the printing means is operated in an exposure-adjustable manner according to inputted information depending on the operation of controlling the reference printing is conducted, thus information are recorded on the film with code information having density difference.

When a prior art is applied to a camera wherein information are printed on the film surface, it is possible to enhance recording density for information by adding color information or density information to code information. When recorded information are increased in the above-mentioned method, however, a difference in photographic sensitivity characteristics, an individual difference of printing element, influence of power supply conditions, dispersion in speed of film transport, and aging change of films cause unevenness in density and color (wavelength) of recorded information, resulting in lowered reliability for reading such recorded information.

SUMMARY OF THE INVENTION

An object of the invention is to provide an information storing apparatus and an information reading out apparatus in both of which information of reference density and reference color (wavelength) are recorded on a predetermined area in advance, and based upon these information, judgment standards for reading are established, thus reliability for reading the aforementioned information is enhanced.

The first embodiment of the image recording apparatus of the invention is provided with a plurality of light sources capable of emitting light independently for exposing a part of a film without causing double exposure and with a printing control means wherein at least one of the aforementioned light sources is caused to flash continuously for printing codes for timing during film transport, other light source is caused to flash in synchronizing with flashing of the aforementioned light source for printing codes for photographing information, and the light source for printing the codes for photographing information is caused to flash for printing reference codes which are to be the judgment standards for the codes of photographing information.

In the second embodiment of the information recording apparatus of the invention, a printing control means causes a light source to flash prior to film transport for printing, on the space outside an area where codes for timing on the edge of an image are printed, the codes for indicating the initial position, and with a reference of the codes for indicating the initial position, the aforementioned codes for timing, the codes for photographing information and the reference codes are printed.

In the third embodiment of the image recording apparatus of the invention, a printing control means changes an exposure amount for a film based on the degree of intensity of a light source for changing density, and prints a plurality of codes for photographing information on a predetermined area under the light emission intensity established in advance.

In the fourth embodiment of the image recording apparatus of the invention, a film is exposed to a plurality of light sources each having different wavelength of emitted light, and plural pieces of information are printed on a predetermined region by a light source set in advance.

The fifth embodiment of the image reading out apparatus of the invention is provided with an information reading means that reads codes for timing printed continuously during film transport, codes for photographing information printed in synchronizing with the codes for timing and reference codes which are standards for judging the codes for photographing information and with an information processing means that judges codes for photographing information based on criteria stipulated by the reference codes.

The sixth embodiment of the image reading out apparatus of the invention is provided with an initial position reading means that reads codes for indicating the initial position printed prior to film transport under a flashing light source on the space outside an area for printing codes for timing at the edge of an image, an information reading means that reads codes for timing printed continuously during film transport based on reading of codes for indicating the initial position, codes for photographing information printed in synchronizing with codes for timing, and reference codes which are criteria for judging the codes for photographing information, and with an information processing means that judges codes for photographing information based on criteria stipulated by the reference codes for detection.

In the seventh embodiment of the information reading out apparatus of the invention, an information processing means judges density of codes for photographing information based on reference density stipulated by reference codes and thereby detects codes for photographing information.

In the eighth embodiment of the information reading out apparatus of the invention, an information processing means judges wavelength of codes for photographing information based on reference wavelength stipulated by reference codes and thereby detects codes for photographing information.

In the first embodiment mentioned above, codes for timing are printed continuously during film transport with a flashing light source, codes for photographing information are printed in synchronizing with printing of codes for timing, and reference codes which are criteria for judging codes for photographing information are printed.

In the second embodiment mentioned above, codes for indicating the initial position are printed prior to film transport under a flashing light source on the space outside an area where codes for timing at the edge of an image are printed.

In the third embodiment, an exposure amount for film is changed depending on the degree of light emission intensity of the light source for changing density, and a plurality of codes for photographing information are printed on a predetermined area under the light emission intensity established in advance.

In the fourth embodiment, a film is subjected to exposure by means of a plurality of light sources each having different wavelength, and plural pieces of information are printed on a predetermined area under a light source set in advance.

In the fifth embodiment, codes for timing printed continuously during film transport, codes for photographing information printed in synchronizing with the codes for timing, and reference codes to be criteria for judging the codes for photographing information are read, and based on criteria stipulated by the reference codes, codes for photographing information are judged for detection.

In the sixth embodiment, codes for indicating the initial position printed prior to film transport under a flashing light source on the space outside an area where codes for timing at the edge of an image are printed are read, and based on reading of the codes for indicating the initial position, codes for timing printed continuously during film transport, codes for photographing information printed in synchronizing with the codes for timing, and reference codes which are criteria for judging the codes for photographing information are read, and the codes for photographing information are judged for detection based on the criteria stipulated by the reference codes.

In the seventh embodiment, density of codes for photographing information is judged based on reference density stipulated by reference codes for detecting the codes for photographing information.

In the eighth embodiment, wavelength of codes for photographing information is judged based on reference wavelength stipulated by reference codes for detecting the codes for photographing information.

DETAILED DESCRIPTION OF THE PREFERRED EMBODIMENTS

Examples of the image recording apparatus and the image reading out apparatus of the invention will be explained as follows.

Figure 1:
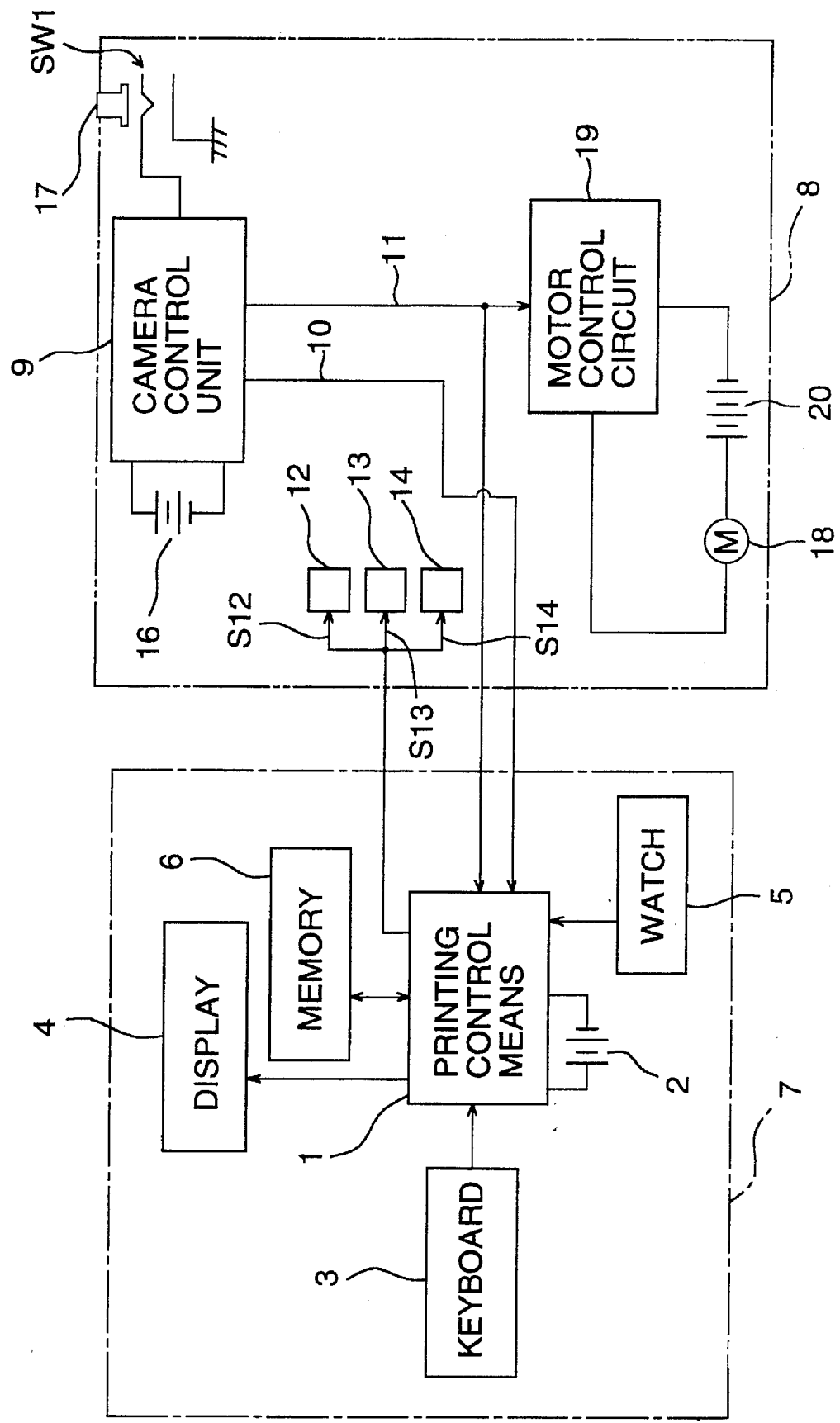
FIG. 1 is a block diagram of an information recording apparatus.
Figure 2:
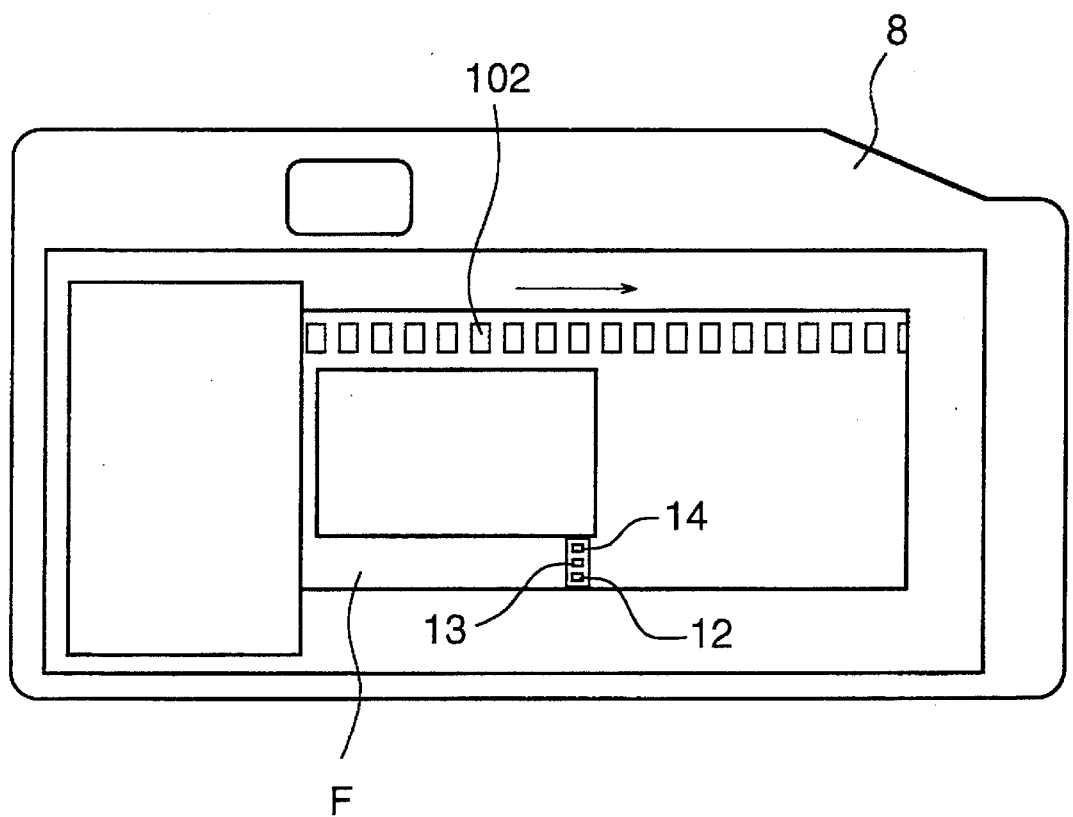
FIG. 2 is a diagram showing how a film is loaded in a camera.
Figure 3:
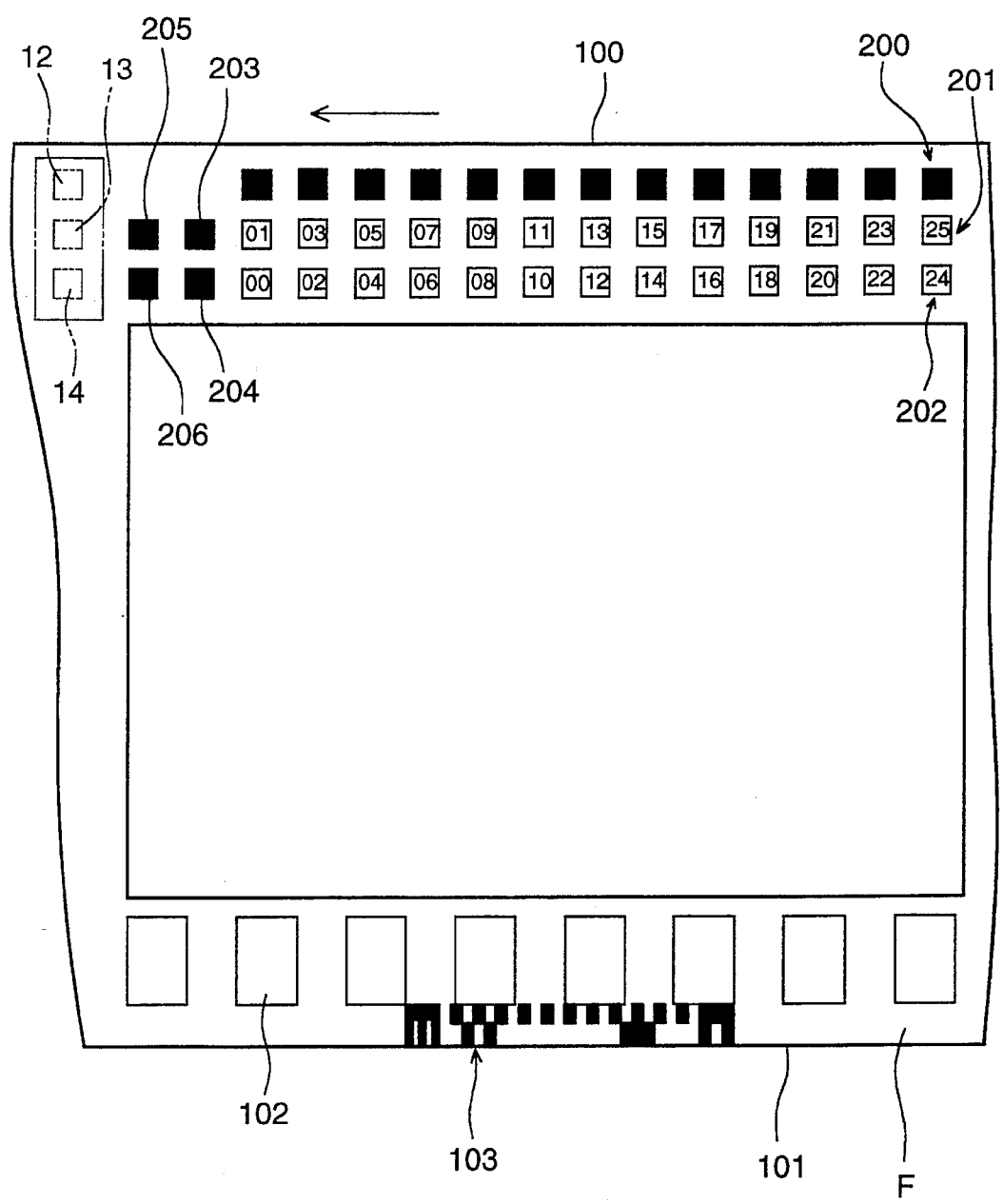
FIG. 3 is a diagram showing the shape of a film and a position where information are printed.
Figure 4:
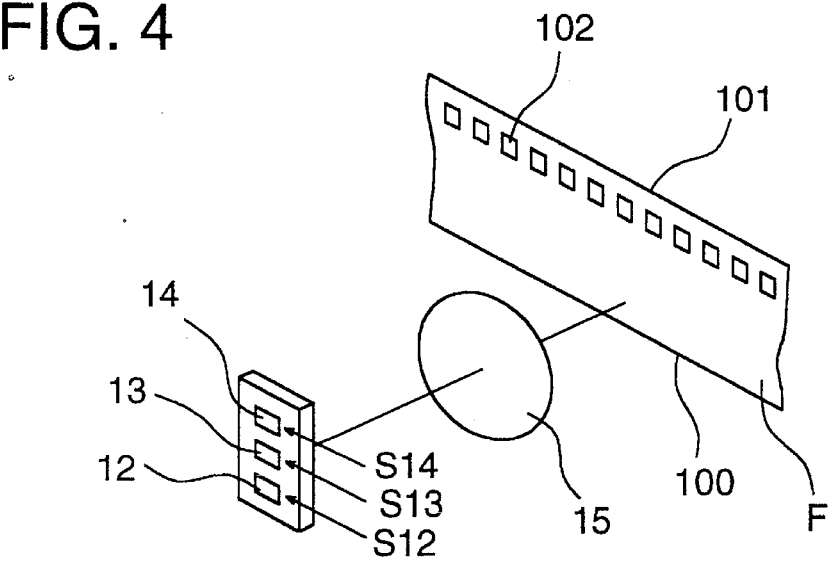
FIG. 4 is a schematic diagram showing how information are printed.
Figure 5:
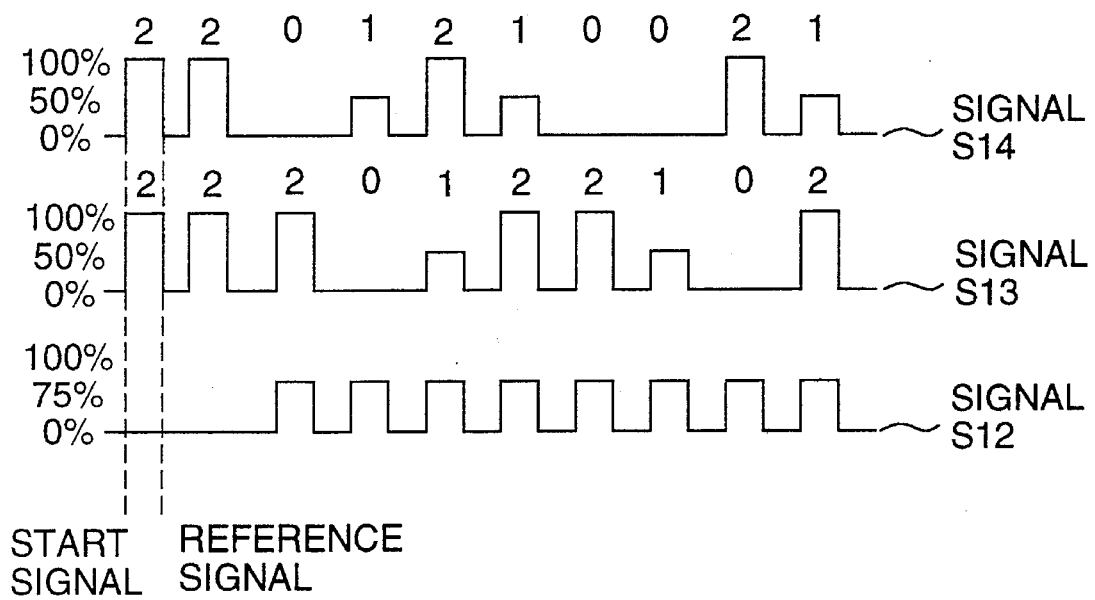
FIG. 5 is a timing chart for printing.
Figure 6:
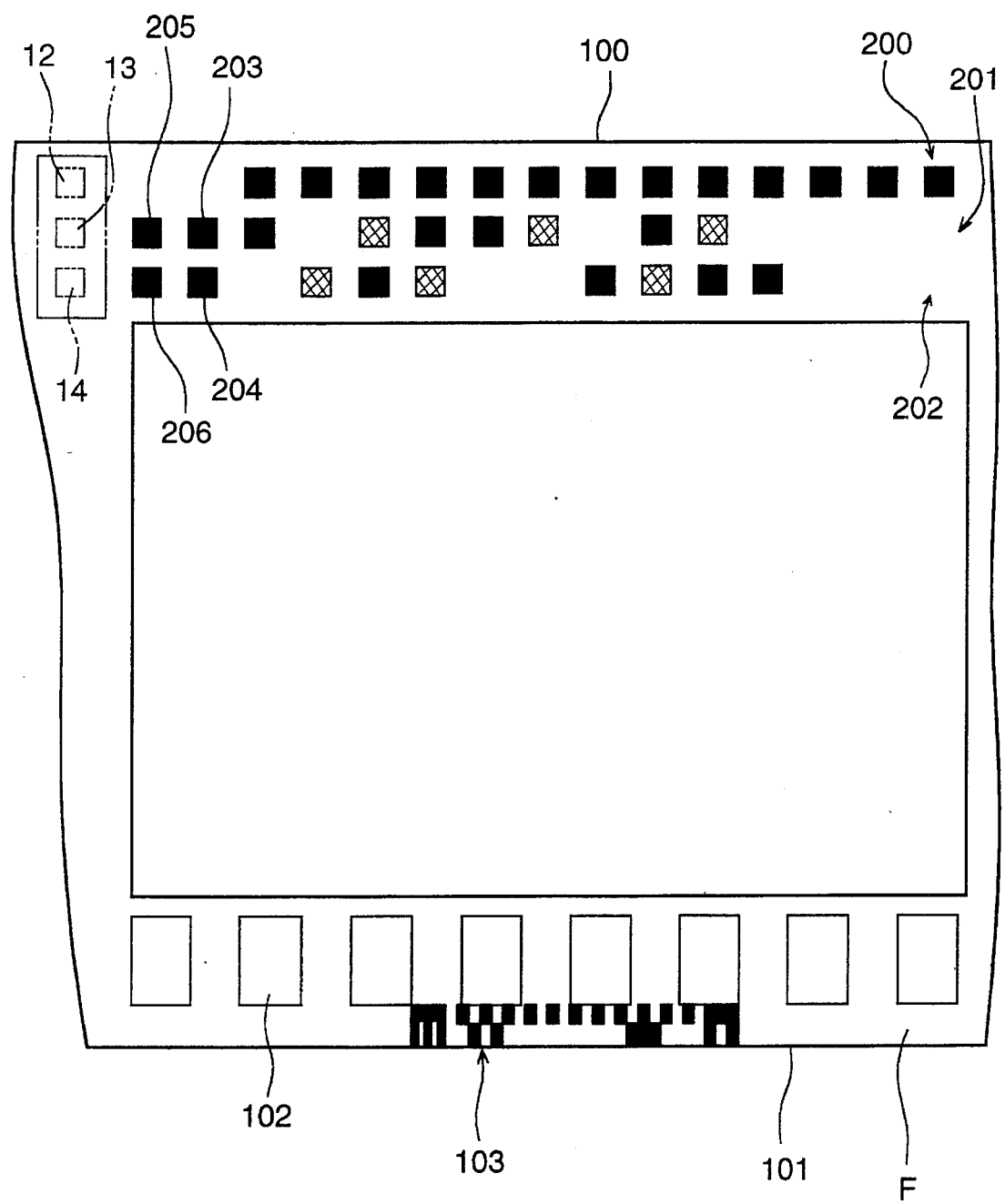
FIG. 6 is a diagram showing the film in which information are printed.

FIG. 1 is a block diagram showing an example of the image recording apparatus of the invention, FIG. 2 is a diagram showing how a film is loaded in a camera, FIG. 3 is a diagram showing the shape of the film and a position where information are printed, FIG. 4 is a schematic diagram showing how information are printed, FIG. 5 is a timing chart for printing and FIG. 6 is a diagram showing the film wherein information are printed.

In FIG. 1, the symbol 1 represents a printing control means composed of a microcomputer for printing information, and the printing control means 1 is driven by two batteries. Into the printing control means 1, there are inputted information, and input and output of the information are controlled by the printing control means when the information are coded and printed in a film. The printing control means 1 is connected with keyboard 3 which is an ordinary one for inputting information and is composed of plural switch boxes.

Display 4 is further connected to the printing control means 1, and information corresponding to code signals coming from the printing control means 1 are displayed on the display 4. The display 4 is composed, for example, of an LED display or a liquid crystal panel. Further, the printing control means 1 is connected with watch 5 which gives information such as time and date to the printing control means 1. The printing control means 1 is further connected with memory means 6 which preserves information inputted therein.

These printing control means 1, batteries 2, keyboard 3, display 4, watch 5 and memory means 6 are assembled together to form a unit, and is housed in, for example, case 7. Information which need to be printed through keyboard 3 before photographing in advance are selected by the printing control means, and the information are inputted directly through an operation of the key.

Photographing information to be recorded on a film include print form information, information about whether a strobe is used or not, film-loading direction information, date information including year, month and date, reliability judgment information (checksum) and extended information (photographing conditions), and in addition to the aforementioned information, an initial position indicating code and a timing code which are for image area detection and information reading respectively are provided. Each information will be explained in detail as follows, on the assumption that "1" on Tables 1–6 and Table 8 is printed with a camera and "0" on Tables 1–6 and Table 8 is not printed with a camera.

With regard to print form information, an image area photographed on a film based on the print form information is printed in a form shown in Table 1 below.

TABLE 1

| Mag (2) | Mag (1) | Mag (0) | Print form |
|---|---|---|---|
| 0 | 0 | 0 | Normal size (1:1.5) 1.0 times |
| 0 | 0 | 1 | Normal size (1:1.5) 2.0 times |
| 0 | 1 | 0 | Panorama (1:2.8) |
| 0 | 1 | 1 | High-Definition Television (1:1.8) |
| 1 | 0 | 0 | Normal size (1:1.5) 1.2 times |
| 1 | 0 | 1 | Normal size (1:1.5) 1.4 times |
| 1 | 1 | 0 | Normal size (1:1.5) 1.7 times |
| 1 | 1 | 1 | Spare |

With regard to information about whether a strobe is used or not, it can be shown as in Table 2 below and is used for determination of exposure conditions used when printing images.

TABLE 2

| Flash (0) | Photographing information |
|---|---|
| 0 | Photographing using no strobe |
| 1 | Photographing using a strobe |

With regard to information about film-loading direction, the direction of a photographed image area is detected on the image printing apparatus as shown in Table 3 below by that information.

TABLE 3

| UpDown (0) | Photographing information |
|---|---|
| 0 | Regular film-loading camera (a camera wherein a cartridge is located on the left when the camera is viewed from its back) |
| 1 | Inversed film-loading camera (a camera wherein a cartridge is located on the right when the camera is viewed from its back) |

With regard to date information, it is utilized when the date of photographing is printed on a photographic paper. When information shown in Tables 4, 5 and 6 are "0", the date does not need to be printed.

With regard to "year", it represents the number of years which have passed from the reference year.

TABLE 4

Year

| Y (4) | Y (3) | Y (2) | Y (1) | Y (0) | Year of photographing | | |
|---|---|---|---|---|---|---|---|
| 0 | 0 | 0 | 0 | 0 | Reference year | (1990) | (2022) |
| 0 | 0 | 0 | 0 | 1 | Reference year + 1 | (1991) | (2023) |
| 0 | 0 | 0 | 1 | 0 | Reference year + 2 | (1992) | (2024) |
| 0 | 0 | 0 | 1 | 0 | Reference year + 3 | (1993) | (2025) |
| ۱ | ۱ | ۱ | ۱ | ۱ | ۱ | | |
| 1 | 1 | 1 | 1 | 0 | Reference year + 30 | (2020) | (2052) |
| 1 | 1 | 1 | 1 | 1 | Reference year + 31 | (2021) | (2053) |

TABLE 5

Month

| M (3) | M (2) | M (1) | M (0) | Month of photographing |
|---|---|---|---|---|
| 0 | 0 | 0 | 0 | — |
| 0 | 0 | 0 | 1 | January |
| 0 | 0 | 1 | 0 | February |
| ۱ | ۱ | ۱ | ۱ | ۱ |
| 1 | 0 | 1 | 0 | October |
| 1 | 0 | 1 | 1 | November |
| 1 | 1 | 0 | 0 | December |

TABLE 6

Day

| D (4) | D (3) | D (2) | D (1) | D (0) | Day of photographing |
|---|---|---|---|---|---|
| 0 | 0 | 0 | 0 | 0 | — |
| 0 | 0 | 0 | 0 | 1 | 1st day |
| 0 | 0 | 0 | 1 | 0 | 2nd day |
| ۱ | ۱ | ۱ | ۱ | ۱ | ۱ |
| 1 | 1 | 1 | 0 | 1 | 29th day |
| 1 | 1 | 1 | 1 | 0 | 30th day |
| 1 | 1 | 1 | 1 | 1 | 31st day |

With regard to extended information, it represents a spare for the future extension as shown in Table 7.

TABLE 7

| Extend (0) | Spare |
|---|---|
| Extend (0) | Spare |

With regard to information for judging information reliability, it is supplement information for judging whether there is an error in information read by an image printing device or not and it shows "information number +1" wherein timing codes are printed in a film among information 00–18 shown in assignment to information printing positions. (checksum)

With regard to a value of information for judging information reliability, "1" is added to the information number wherein timing codes are printed in a film among information 00–18 shown in assignment to information printing positions for the reason that even when no code for photographing information is printed for the reason that both light sources 13 and 14 used for printing codes for photographing information shown in FIG. 1 are out of order or for other reasons, checksum can still be detected. The figure to be added to the information number wherein timing codes are printed in a film among information 00–18 shown in assignment to information printing positions may also be a natural number as a matter of course.

TABLE 8

| Sum (4) | Sum (3) | Sum (2) | Sum (1) | Sum (0) | Meaning |
| --- | --- | --- | --- | --- | --- |
| 0 | 0 | 0 | 0 | 0 | The sum total of each information + 1 (excluding sum, codes for indicating the initial position and spare) |
| ׀ | ׀ | ׀ | ׀ | ׀ | |
| 1 | 1 | 1 | 1 | 1 | |

With regard to codes for indicating the initial position, it is a mark showing the position of an image area photographed and it is recorded at the fixed location on the image area.

With regard to a timing code, it is a mark for detecting the position of each information.

With regard to printing of information, assignments to positions for information printing are shown in Table 9.

TABLE 9

| Printing position | Contents of assignment for information | | |
| --- | --- | --- | --- |
| 00 | Print form | Mag | (0) |
| 01 | Print form | Mag | (1) |
| 02 | Print form | Mag | (2) |
| 03 | Up and Down | UpDown | (0) |
| 04 | Flash | Flash | (0) |
| 05 | Year | Y | (0) |
| 06 | Year | Y | (1) |
| 07 | Year | Y | (2) |
| 08 | Year | Y | (3) |
| 09 | Year | Y | (4) |
| 10 | Month | M | (0) |
| 11 | Month | M | (1) |
| 12 | Month | M | (2) |
| 13 | Month | M | (3) |
| 14 | Day | D | (0) |
| 15 | Day | D | (1) |
| 16 | Day | D | (2) |
| 17 | Day | D | (3) |
| 18 | Day | D | (4) |
| 19 | Checksum | Sum | (0) |
| 20 | Checksum | Sum | (1) |
| 21 | Checksum | Sum | (2) |
| 22 | Checksum | Sum | (3) |
| 23 | Checksum | Sum | (4) |
| 24 | Spare | Extend | (0) |
| 25 | Spare | Extend | (1) |

Next, a film shape and a position for printing information will be explained, referring to FIG. 3. For example, a one-side-perforation film wherein perforations 102 are provided not on long hub side 100 but on short hub side 101 of 135 negative film F is used. Latent images such as those of frame codes, frame numbers and side lines are not printed on the long hub side 100 having no perforations, but latent images of DX codes, frame codes and frame numbers 103 are printed on the short hub side 101.

Camera control signal 10 and interruption signal 11 that instructs the start of printing information on a film are inputted in printing control means 1 from camera control unit 9 of camera main body 8. The camera main body 8 is provided with a plurality of, for example, three light sources 12, 13 and 14 capable of emitting light independently for exposing a part of a film without causing double exposure, and these light sources 12, 13 and 14 are connected to the printing control means 1. These light sources 12, 13 and 14 employ, for example, an LED having a wavelength of 655 nm. The printing control means 1 causes light source 12 among light sources 12, 13 and 14 to flash continuously during film transport for printing timing codes 200, and causes other light sources 13 and 14 to flash in synchronization with flashing of the light source 12 for printing codes 201 and 202 for photographing information, thus the light sources 13 and 14 for printing photographing information codes 201 and 202 are caused to flash for printing reference codes 203 and 204 which are standards for judging the photographing information codes 201 and 202. Printing of timing codes 200 and printing of photographing information codes are conducted through flashing of the light sources 12, 13 and 14 performed based on the detection of an edge of perforation 102. The printing control means 1 causes light sources 13 and 14 to flash prior to film transport and thereby prints initial position indicating codes 205 and 206 on the space other than the area where timing codes 200 for the edge of an image are printed. Further, the printing control means 1 changes an exposure amount for a film for changing density depending on the degree of light emission intensity of the light sources 13 and 14, and thereby prints a plurality of photographing information codes 201 and 202 on the predetermined area at the light emission intensity established in advance.

Light sources 12, 13 and 14 are provided in parallel in the lateral direction that is perpendicular to the direction of transporting film F as shown in FIG. 4, and light from each of the three light sources 12, 13 and 14 forms a reduced image on a printing area through lens 15, thus exposure on the obverse side of the film is conducted.

Camera control unit 9 is driven by battery 16, and when release button 17 is pressed, release signals are inputted from release switch SW1 into the camera control unit to control driving for a diaphragm and a shutter. For example, it outputs signals to start winding a film to motor control circuit 19 that controls motor 18 that is driven by battery 20. Camera control signals 10 of photographing information such as photometric values, shutter speed, range-finding values and others and interruption signals 11 representing signals to start winding a film are inputted from the camera control unit 9 into printing control means 1. Namely, after the start of winding film F, code information and timing signals both stored in memory means 6 of printing control means 1 are generated, thus, information are printed on the film F during the transport of the film F.

The printing control means 1 outputs, in timing shown in FIG. 5, signals S12, S13 and S14 respectively to light sources 12, 13 and 14 which print, based on the signals S12, S13 and S14, timing codes 200, photographing information codes 201 and 202, reference codes 203 and 204 as well as initial position indicating codes 205 and 206, as shown in FIG. 6.

The light source 12 is adjusted to the output level allowing the light source to emit light in quantity of emitted light of 75%, owing to which ON and OFF are repeated continuously. On the other hand, each of light sources 13 and 14 is arranged to emit light at the levels of 0%, 50% and 100% in terms of quantity of emitted light. Owing to that arrangement, each of the light sources 13 and 14 emits light at the level of 100% in terms of emitted light quantity when printing initial position indicating codes 205 and 206 as well as reference codes 203 and 204, while it emits light at the levels of 0% 50% and 100% in terms of emitted light quantity depending upon information when printing photographing information codes 201 and 202. The initial position indicating codes 205 and 206 as well as reference codes 203 and 204 are outputted when the result of detecting the edge of perforation 102 shows ON, and, for example, information are printed on film F through the light sources 13 and 14 after being coded on a basis of multi-gradation of density difference.

Namely, it is possible to print much information with only one bit by coding printing information to be code "0", code "1"and code "2"respectively with emitted light quantity of 0%, 50% and 100% of the light sources 13 and 14. Further, for example, even when an unevenness takes place in film transport and thereby densities of photographing information codes 201 and 202 printed by light sources 13 and 14 and of timing codes 200 printed by light source 12 are changed by the factors such as a difference of speed of each film, an individual difference of a printing element, influence of power supply or the like, fluctuation in speed of film transport, and aging change in film, information can be read accurately with densities of reference codes 203 and 204 which serve as standards when the information are read. In this way, it is possible to improve reliability of information reading for accurate reading of information by recording information with reference density on a predetermined area in advance and by establishing criteria for judgment for reading based on the aforementioned information.

In FIG. 5, photographing information codes 202 represent "0", "1", "2", "1", "0", "0", "2" and "1", while photographing information codes 201 represent "2", "0", "1", "2", "2", "1", "0" and "2". Further, even when a physical length per 1 bit of code printed on a film is changed by an unevenness of film transport or the like, it is possible to read information accurately by correcting with timing codes 200 which serve as standards during information reading, because photographing information codes 201 and 202 are printed in synchronization with timing codes 200.

Incidentally, in the example mentioned above, initial position indicating codes 205 and 206 are printed separately from reference codes 203 and 204. However, both the initial position indicating codes 205 and 206 and the reference codes 203 and 204 can be used in common. In this case, the reference codes 203 and 204 are printed at the location for the initial position indicating codes 205 and 206.

Figure 7:
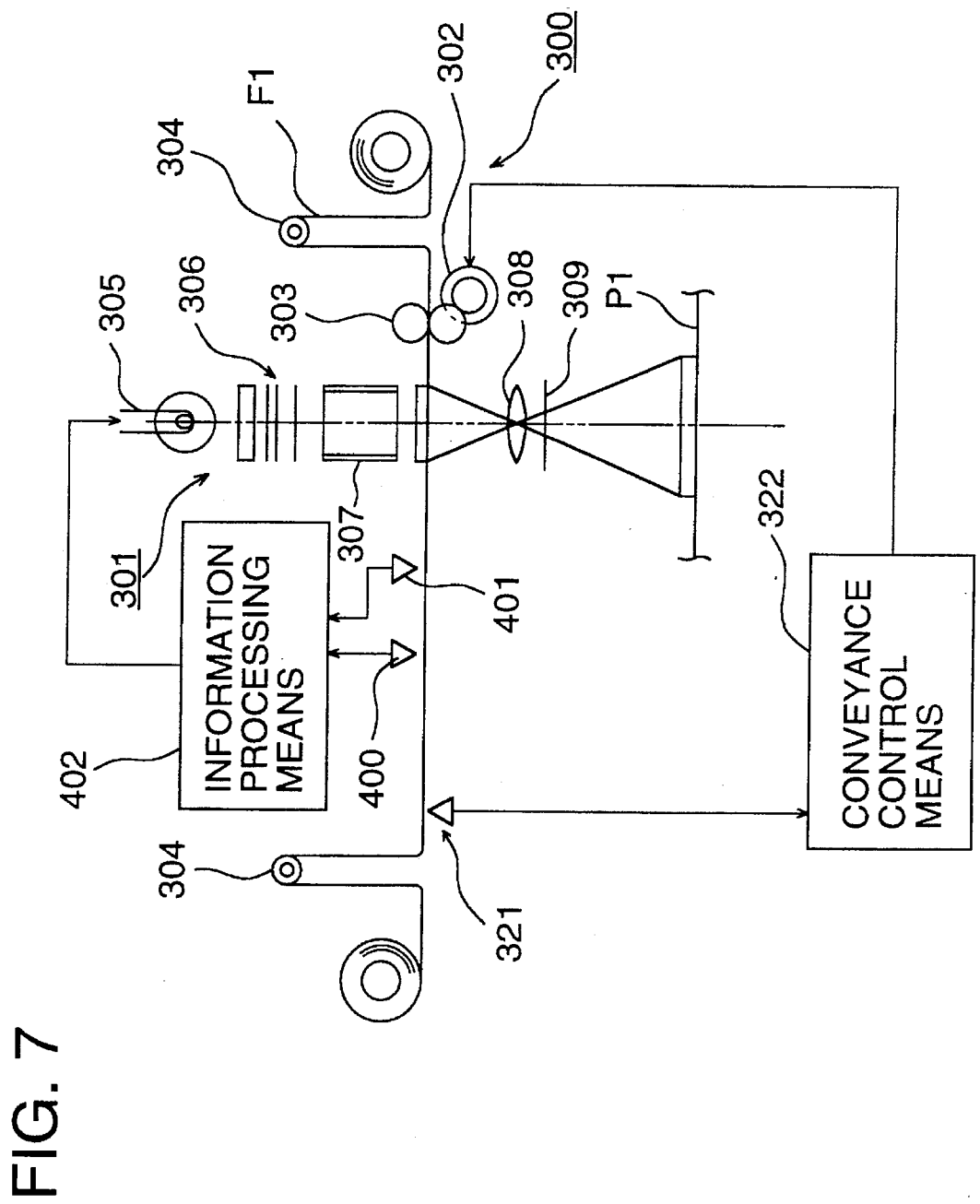
FIG. 7 is a block diagram of an image printing apparatus equipped with an information reading device.

FIG. 7 is a block diagram showing an example of the image printing apparatus equipped with an information reading apparatus of the invention.

The image printing apparatus mentioned above is provided with film transport means 300 that transports roll film F1 and optical exposure means 301 through which photographic paper P1 is exposed to an image on the roll film F1. The film transport means 300 is composed of stepping motor 302, transport roller 303, pinch roller 304 and others and it transports the roll film F1 or stops it. The optical exposure means 301 is composed of light source 305, guide filter 306, mirror tunnel 307, zoom lens 308, shutter 309 and others. The roll film F1 is in the shape of a roll wherein a plurality of films as shown in FIG. 6, for example, are spliced. On this roll film F1, there are formed notches corresponding to photographing image areas. On the step preceding the optical exposure means 301, there is provided notch detection sensor 321, and detection signals from the notch detection sensor 321 are sent to transport control means 322 where an exposure position on the roll film F1 is calculated based on the detection signals, and thereby the film transport means 300 is controlled to stop the roll film F1 at the exposure position determined by the calculation.

Further, the image printing apparatus is provided with initial position reading means 400 that reads initial position indicating codes printed before film transport through flashing of a light source on the region outside an area where timing codes of edges of images are printed, information reading means 401 that reads timing codes printed continuously during film transport based on reading of the initial position indicating codes, photographing information codes printed in synchronization with the timing codes and reference codes which serve as criteria for judgment of the photographing information codes, and with information processing means 402 that judges, for detection, the photographing information codes based on the criteria stipulated by the reference codes, and optical exposure means 301 is controlled based on information processed by the information processing means 402 for printing images. The information processing means 402 judges density of photographing information codes based on the reference density stipulated by the reference codes, and detects photographing information codes.

As stated above, there are read initial position indicating codes printed before film transport through flashing of a light source on the region outside an area where timing codes of image edges are printed, and based on reading of the initial position indicating codes, there are read timing codes printed continuously during film transport based on reading of the initial position indicating codes, photographing information codes printed in synchronization with the timing codes mentioned above and reference codes which serve as criteria for judging the photographing information codes mentioned above, and based on criteria stipulated by the aforementioned reference codes, there are judged photographic information codes for detection. Therefore, even when recorded information are increased, information processing are conducted with initial position indicating codes which serve as criteria and photographing information codes are judged with reference codes which serve as criteria. Owing to the foregoing, it is possible to prevent that reliability of reading information is lowered by the factors such as a difference in speed characteristics of each film, and individual difference of a printing element, an influence of the state of power supply, fluctuation in film transport speed, and aging change of a film.

Figure 8:
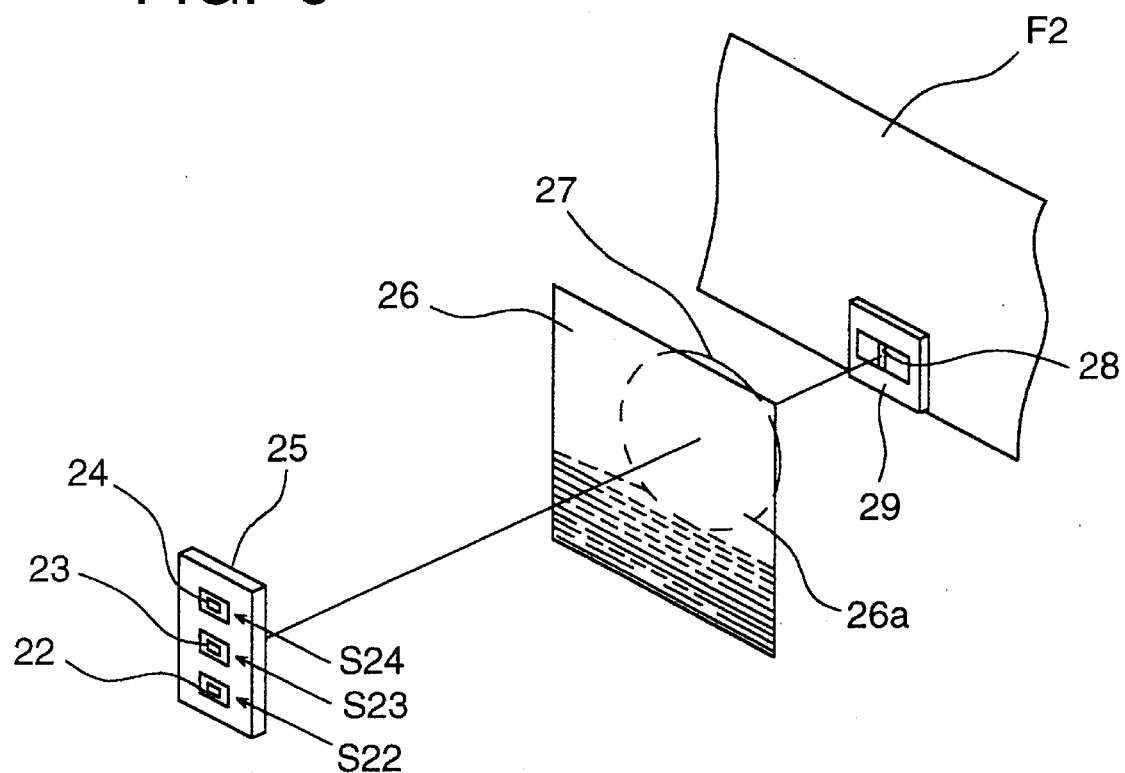
FIG. 8 is a schematic diagram showing how information are printed.
Figure 9:
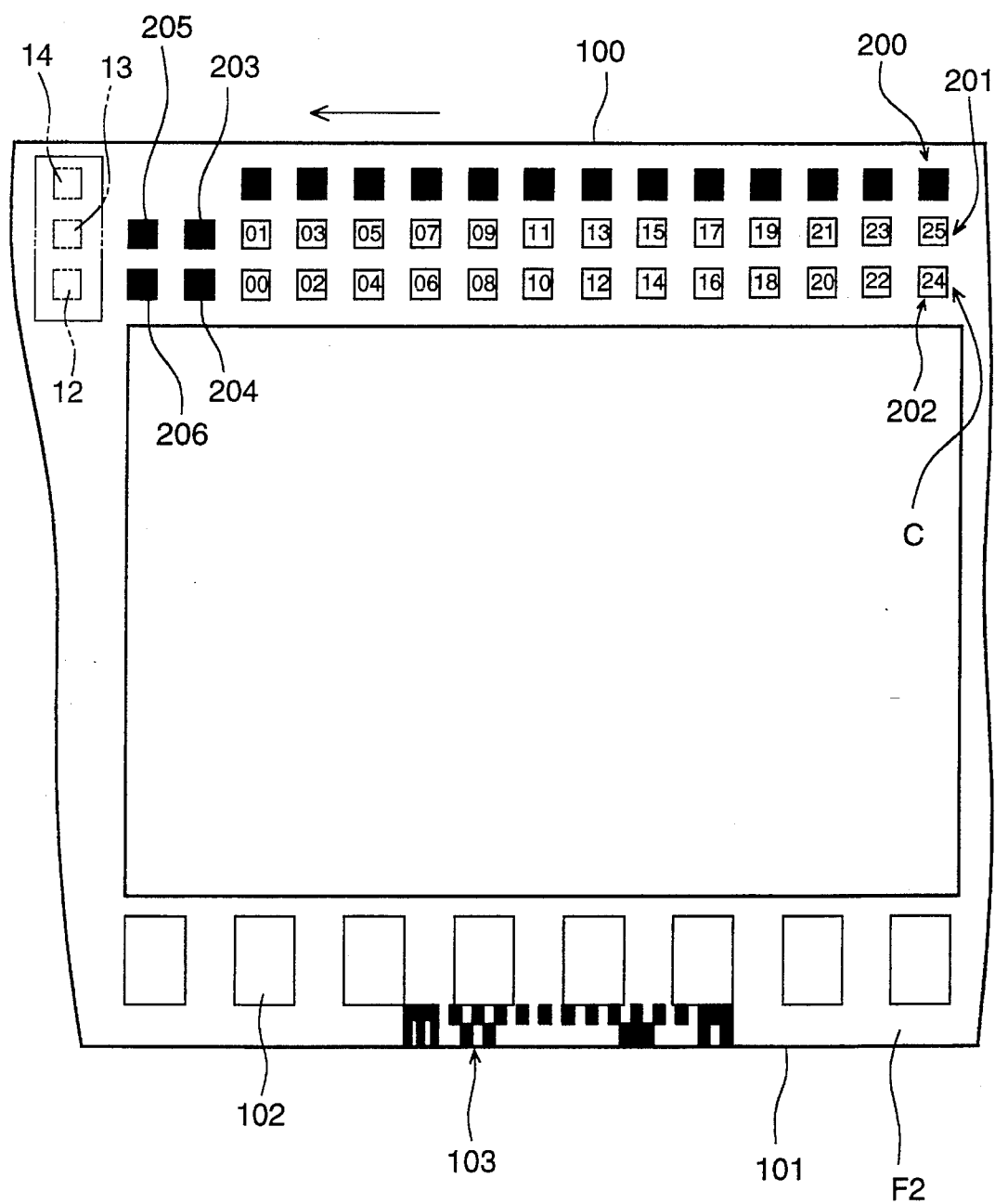
FIG. 9 is a diagram showing the shape of a color film and a position where information are printed.

Next, an example of other information recording apparatus of the invention will be explained as follows, referring to FIGS. 8–13. FIG. 8 shows an example of an apparatus for recording information on a film related to the invention, and FIG. 9 shows a part of color film F2 on which information are recorded. In this example, three light sources 22, 23 and 24 each composed of a light emitting diode having a central emission wavelength of blue, green and red respectively are aligned on the same board so that they may be controlled respectively by emission control signals S22, S23 and S24. These three light sources 22, 23 and 24 form images on color film F2 through phase diffraction grating 26 and image-forming lens 27 that is arranged to form a reduced image. Field frame 29 having thereon aperture 28 is arranged immediately before the color film F2.

Figure 10:
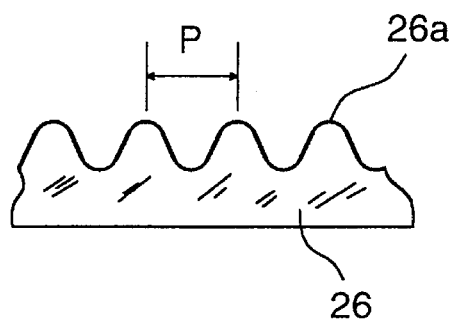
FIG. 10 is a sectional view of a phase diffraction.grating.
Figure 11:
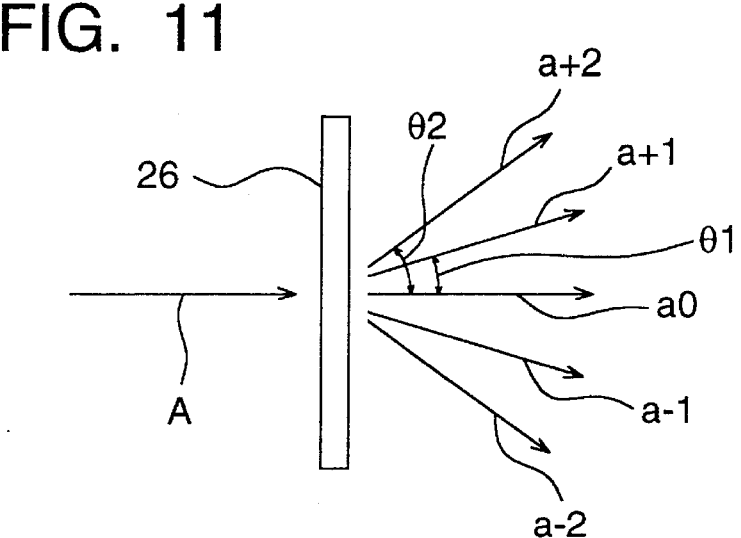
FIG. 11 is a diagram illustrating actions.

The phase diffraction grating 26 has a large number of grid lines 26a which serve as a means for one-way diffusion, and a section of each grid line shows a sine wave form as shown in FIG. 10. FIG. 11 shows diffusion in the one-dimensional direction caused by the phase diffraction grating 26, and when a beam of light A enters the phase diffraction grating 26, a large number of diffracted light such as 0-order diffracted light a0, +1-order diffracted light a+1, +2-order diffracted light a+2, −1-order diffracted light a−1, −2-order diffracted light a−2 and others are generated in the direction perpendicular to that of grid line 26a. Angle of diffraction $\theta_N$ of N-order diffracted light in this case can be bound from the following expression when P represents a pitch of a diffraction grating and λ represents a wavelength of incident light, provided, however, that N takes 0, ±1, ±2, . . . .

$$p \cdot \sin\theta_N = N/\lambda$$

Figure 12:
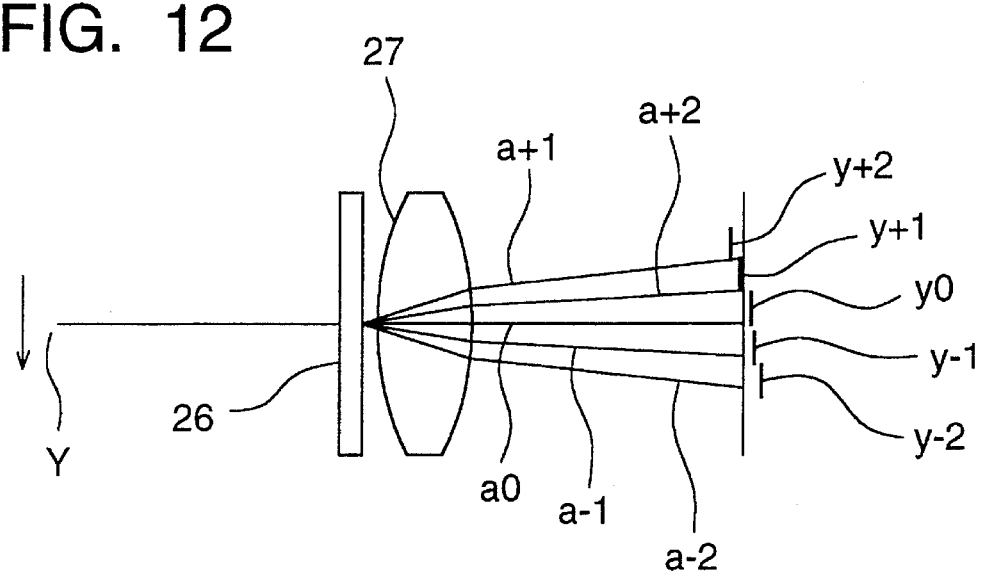
FIG. 12 is a diagram illustrating actions.

In the image-forming optical system as shown in FIG. 12, therefore, when phase diffraction grating 26 having grid lines 26a in the horizontal direction is arranged immediately before the image-forming lens 27, images y0, y+1, y+2, . . . , y−1, y−2, . . . caused by a large number of diffracted light for subject Y are vertically slipped and superimposed. As stated above, images formed respectively by three light sources each having different color can be superimposed easily within a single image. Therefore, it is possible to make a single code pattern to have three kinds of code signals corresponding respectively to emission control signals S22, S23 and S24, which makes it easy to print code information.

Figure 13:
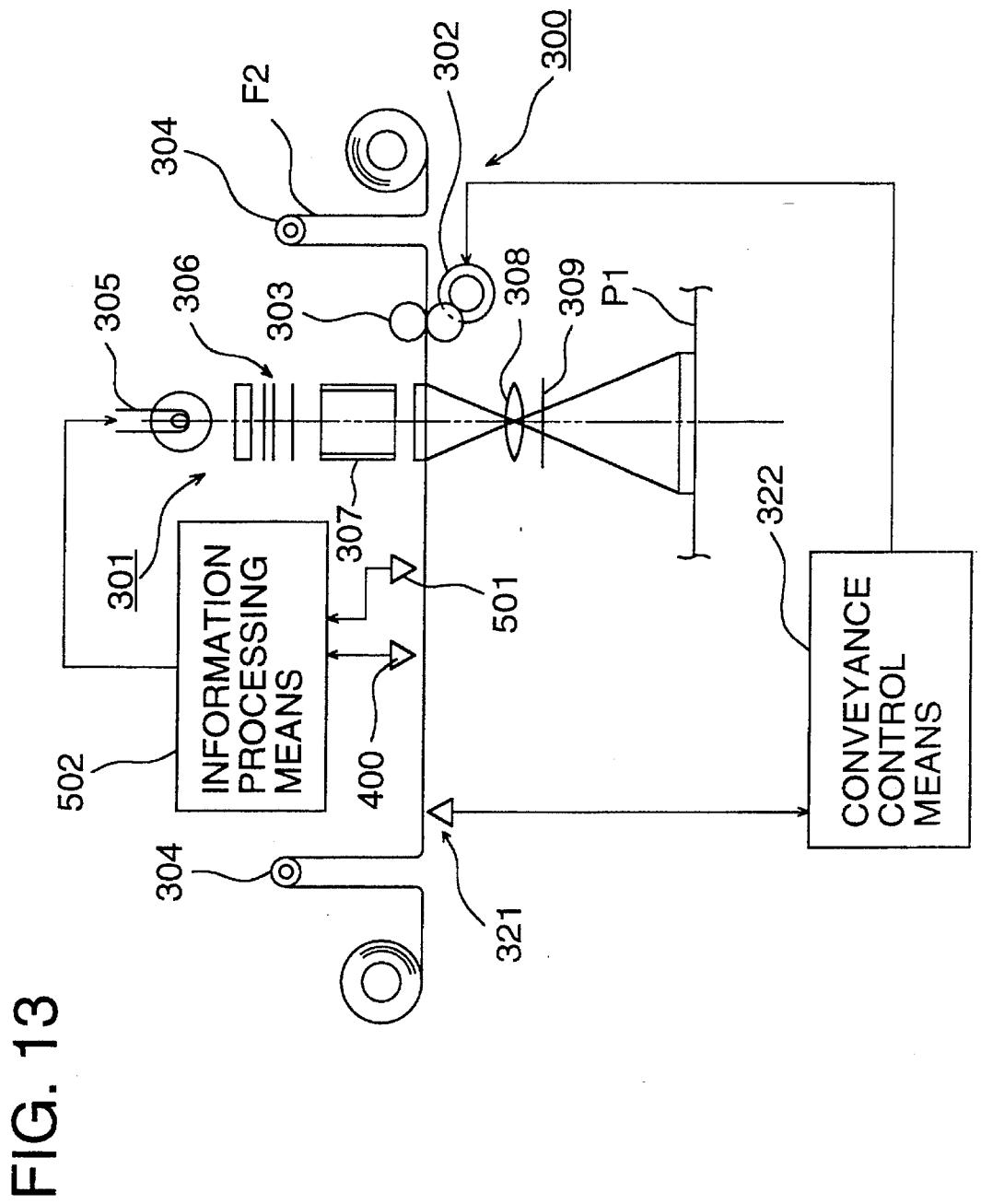
FIG. 13 is a block diagram of an image printing apparatus equipped with an image reading device.

FIG. 13 is a block diagram showing an example of an image printing apparatus equipped with an information reading apparatus of the invention.

On the image printing apparatus mentioned above which is constituted similarly to FIG. 7, when color film F2 is read by information-reading means 5, code information corresponding to each color is read through a color separation system for three colors in the color film F2. Information-processing means 502, on the other hand,, judges wavelengths of photographing information codes based on the reference wavelength stipulated by reference codes, and detects photographing information codes by judging density of the photographing information codes based on reference density stipulated by reference codes which detect photographing information codes. Optical exposure means 301 is controlled for image printing based on information processed in the information-processing means 502.

Photographing information codes are detected after judging their wavelengths based on the reference wavelength stipulated by reference codes. Therefore, even when recorded information are increased by a plurality of light sources each having different wavelength, it is possible to enhance reliability for reading the recorded information and thereby to read information accurately.

In the aforementioned first embodiment, as stated above, timing codes are printed continuously during film transport under flashing of light, photographing information codes are printed in synchronization with printing of the timing codes mentioned above, and reference codes which serve as criteria for judgment of the photographing information codes are further printed. Therefore, even when recorded information are increased, it is possible to judge photographing information codes during reading process with reference codes which serve as criteria, and thereby to prevent that reliability of reading information is lowered by factors such as a difference in speed characteristics of each film, an individual difference of the state of power supply, fluctuation in film transport speed, and aging change of a film.

In the second embodiment of the invention, initial position indicating codes are printed before film transport through flashing of a light source on the region outside an area where timing codes of image edges are printed. Therefore, it is possible to print accurately timing codes, photographing information codes and reference codes with the initial position indicating codes which serve as a reference.

In the third embodiment of the invention, an exposure amount for a film is changed for changing density depending on the degree of light emission intensity of a light source and thereby a plurality of photographing information codes are printed on the predetermined area at the light emission intensity established in advance. Therefore, even when recorded information are increased by changing an exposure amount and thereby changing density, it is possible to improve reliability of reading the increased information and to read the information accurately.

In the fourth embodiment of the invention, a film is exposed to a plurality of light sources each having different wavelength of emitted light, and plural pieces of information are printed on a predetermined region by a light source set in advance. Therefore, even when recorded information are increased by plural light sources each having different wavelength of emitted light, it is possible to improve reliability of reading the increased information and to read the information accurately.

In the fifth embodiment of the invention, timing codes printed continuously during film transport, photographing information codes printed in synchronization with the timing codes and reference codes which serve as criteria for judgment of the photographing information codes are read, and the photographing information codes are judged to be detected based on criteria stipulated by the reference codes. Therefore, even when recorded information are increased, it is possible to prevent that reliability of reading information is lowered by factors such as a difference in speed characteristics of each film, an individual difference of the state of power supply, fluctuation in film transport speed, and aging change of a film, by judging photographing information codes by using reference codes as criteria.

In the sixth embodiment of the invention, initial position indicating codes printed before film transport through flashing of a light source on the region outside an area where timing codes of image edges are printed are read, and timing codes printed continuously during film transport based on reading of the initial position indicating codes, photographing information codes printed in synchronization with the timing codes and reference codes which serve as criteria for judgment of the photographing information codes are read, thus the photographing information codes are judged to be detected based on criteria stipulated by the reference codes. Therefore, even when recorded information are increased, it is possible to prevent that reliability of reading information is lowered by factors such as a difference in speed characteristics of each film, an individual difference of the state of power supply, fluctuation in film transport speed, and aging change of a film, because information processing is conducted with a reference of the initial position indicating codes and photographing information codes are judged with a reference of reference codes.

In the seventh embodiment of the invention, photographing information codes are detected by judging density of the photographic information codes based on reference density stipulated by reference codes. Therefore, even when recorded information are increased by changing an exposure amount for a film and thereby changing density, it is possible to improve reliability of reading the increased information and to read the information accurately.

In the eighth embodiment of the invention, photographing information codes are detected by judging wavelength of the photographic information codes based on reference wavelength stipulated by reference codes. Therefore, even when recorded information are increased by a plurality of light sources each having different wavelength of emitted light, it is possible to improve reliability of reading the increased information and to read the information accurately.

What is claimed is:

1. A method for processing a plurality of frames recorded on a photographic material in accordance with photographic information on each of said frames, said method comprising:

transporting the photosensitive material;

exposing said photosensitive material intermittently to record a timing code by a light source during transportation of said material;

exposing said photosensitive material to record a photographic information code, disposed parallel to said timing code, representing photographic information related to each of the frames by said light source in synchronization with said timing code;

providing an initial position indicating code representing a positional reference for recognizing each of said frames;

providing a reference code representing a standard for judging said photographic information code;

reading said position indicating code during transportation of said material to recognize one of said frames being processed;

reading said reference code during transportation of said material;

reading said photographic information code in synchronization with said timing code corresponding to said position indicating code;

comparing said photographic information code with said reference code to generate a photographic information signal corresponding to said frame; and processing said frame based on said photographic information signal.

2. The method of claim 1 wherein said position indicating code and said reference code are recorded on said material at the same time, whereby said position indicating code and said reference code are used simultaneously.

3. The method of claim 1 wherein a light quantity of said light source is changed in accordance with said information, when said photographic information code is recorded on said material.

4. The method of claim 1 wherein a wavelength of said light source is changed in accordance with said photographic information, when said photographic information code is recorded on said material.

5. The method of claim 3 further comprising a comparing step wherein said photographic information code is judged by comparing a density of said photographic information code with a density of said reference code.

6. The method of claim 1 further comprising a comparing step wherein said photographic information code is judged by comparing a wavelength of said photographic information code with a wavelength of said reference code.

7. The method of claim 1 wherein said initial position indicating code and said reference code are recorded on said material at the same time, when said light source is prevented from recording said timing code whereby said initial position indicating code and said reference code are used simultaneously.

8. The method of claim 7 wherein a light quantity of said light source is changed in accordance with said photographic information, when said photographic information code is recorded on said material.

9. The method of claim 7 wherein a wavelength of said light source is changed in accordance with said photographic information, when said photographic information code is recorded on said material.

10. The method of claim 8 further comprising a comparing step wherein said photographic information code is judged by comparing a density of said photographic information code with a density of said reference code.

11. The method of claim 9 further comprising a comparing step wherein said photographic information code is judged by comparing a wavelength of said photographic information code with a wavelength reference.

* * * * *